Sept. 7, 1943. McGARVEY CLINE 2,328,891

APPARATUS FOR THE TREATMENT OF CRUDE OLEO-RESINS

Filed Sept. 19, 1938 3 Sheets-Sheet 1

Inventor

McGarvey Cline

By

Stone, Boyden & Mack.

Attorneys.

Sept. 7, 1943. McGARVEY CLINE 2,328,891

APPARATUS FOR THE TREATMENT OF CRUDE OLEO-RESINS

Filed Sept. 19, 1938 3 Sheets-Sheet 2

Inventor
McGarvey Cline
By
Stone, Boyden & Mack
Attorneys.

APPARATUS FOR THE TREATMENT OF CRUDE OLEO-RESINS

Filed Sept. 19, 1938 3 Sheets-Sheet 3

Inventor

Mc Garvey Cline.

By Stone, Boyden & Mack.
Attorneys.

UNITED STATES PATENT OFFICE 2,328,891

APPARATUS FOR THE TREATMENT OF CRUDE OLEORESINS

McGarvey Cline, Jacksonville, Fla., assignor to Wood Process Company, Inc., Jacksonville, Fla., a corporation of Florida Application September 19, 1938, Serial No. 230,745

16 Claims. (Cl. 210—191)

This invention relates to apparatus for separating extraneous contaminating materials from crude oleo-resins and particularly from oleo-resin exudates from living pine trees at the stage after such exudates have been obtained from the trees but before treatment thereof to separate them into rosin and turpentine.

To clearly indicate the relation between the present invention and the naval stores industry the following general explanation is advanced as to the oleo-resin art. As is well known, crude pine oleo-resins constitute the basic raw material of the gum navel stores industry. They are obtained by the periodic scarification of pine trees and by directing the oleo-resin, which exudes from the scar, into cups attached to the trees. The exudates are removed from the cups and collected in barrels, which are the containers ordinarily used for the transportation of the crude oleo-resin from the forest to the still. The annual production of crude pine oleo-resin in the Southeastern States, in those regions bordering the Atlantic Ocean and Gulf of Mexico, aggregates approximately three million barrels of fifty gallons capacity. Its production and conversion into rosin and turpentine constitutes one of the chief industries of the regions in which it is produced. The oleo-resins obtained from the scarification of living trees differ radically from the oleo-resinous materials extracted from dead pine wood, which oleo-resinous materials constitute the raw materials used by the wood naval stores industry for the production of wood turpentine, wood rosin, pine oil, dipentene, and other products. The manufacturing arts of the gum and wood naval stores industries differ basically in their techniques. Filtration has always been a major problem in the art of processing the exudates of living trees, while the wood naval stores industry is not at all concerned with the art of filtration; its basic art deals with the extraction of its raw materials from the cellular structure of the wood in which they are contained.

During the long period of exposure to which the oleo-resin is subjected, in flowing from the scar on the tree to the cups, and in the cups prior to its collection, the oleo-resin becomes contaminated with various extraneous substances such as chips, pine needles, bark, and, pollens and dust of various origins. Chemical modifications are also induced by the conditions of exposure. Oxidation is the most important agency in producing chemical modification. The chemical change which most affects the problem of filtration is the formation of gummy materials which are only slightly soluble in the crude oleo-resin even after the oleo-resin has been liquefied by the application of heat. These gummy substances coalesce around particles of dust and adhere to other extraneous materials present in the crude oleo-resin.

Another change during the period of exposure which seriously affects the problem of filtering crude oleo-resin, is the formation of semi-solid lumps of oleo-resin due to the evaporation of some of its terpene content. In the terminology of the industry these lumps, or cakes, are called "scrape." As the producing season progresses from the early months of spring to its substantial conclusion in November, the amount of scrape collected along with the exudate caught in the cups increases until at the end of the producing season substantially all of the oleo-resin collected consists of scrape, removed from the scarified surface of the tree after the flow of oleo-resin has ceased. These lumps of scrape make crude oleo-resin a very non-homogeneous material. The lumpy material is a poor conductor of heat and is also of higher specific gravity than the more fluid oleo-resin. It sinks to the bottom of the barrels in which the crude is collected and also sinks in larger containers which may be used for melting the material. To obtain a reasonably quick liquefaction of scrape requires temperatures in excess of the boiling point of a mixture of water and terpenes and also requires effective agitation to secure solution of the scrape with the more liquid material. To avoid excessive loss of terpenes, the liquefaction of the crude aggregate must be accomplished in a vapor-tight container.

Aside from merely heating crude oleo-resins to secure liquefaction of the aggregate composing crude oleo-resin exudates, a solvent such as turpentine may be used either without the application of heat or with the application of heat to a degree which does not produce temperatures as high as the boiling point of a mixture of turpentine and water. The latter method of liquefaction has been preferred to the method discussed in the preceding paragraph because a better gravity stratification of the contaminating solids and liquefied materials can be obtained with it than can be obtained by liquefaction without the use of a solvent. The better stratification obtained when a solvent is used is due to the decrease in specific gravity of the liquid materials without a corresponding decrease in the specific gravity of solid material saturated with the original higher gravity oleo-resins, which saturating materials are not materially affected by the solvent. Gravity sedimentation, however, does not affect suspended solid matter having substantially the same specific gravity as the liquid material. In the practice of liquefaction followed by a period of time sufficiently long to obtain gravity stratification, the liquid materials are decanted from the stratum lying between floating solids and settled solids combined with other higher gravity materials. After decantation, however, a mixture of floating solids, settled solids, and liquid oleo-resinous material remain in the processing vessel. The specific gravity of oleo-resin varies materially with its temperature. Sedimentation is disturbed by convectional currents induced by loss of heat during the period of sedimentation. Sedimentation, therefore, within periods of time limiting commercial practice can only be relied upon to accomplish, what might be termed, a primary separation of liquids and solids, by means of decantation. Such a primary separation permits the use of steam stills equipped with steam coils for the distillation of oleo-resin into rosin and turpentine, but it does not eliminate the necessity for straining the rosin through a filtering medium. It is also true that sedimentation and decantation merely serve to concentrate the solids contained in the original crude oleo-resin in an oleo-resinous residue which must be removed from the treating vessel and further processed in order to prevent material loss of oleo-resinous material.

The practical objections to what is termed the French System of processing oleo-resinous materials have been of such economic importance, that they have never been adopted as commercial practice in the United States. The practice in this country has been to charge the crude oleo-resin directly into the stills together with all of its contaminating materials. The stills are ordinarily charged with from eight to ten barrels of crude oleo-resin, a barrel containing approximately 435 pounds of crude. In this practice, the use of steam stills equipped with heating coils has been avoided since the contaminating pine needles, chips, etc., can not be readily discharged from a still containing coils. Direct fire stills, therefore, are almost universally used in the United States, for the production of gum rosin and gum turpentine. After the volatile constituents of the crude oleo-resin have been distilled from the charge, the melted non-volatile residue (rosin) heated to a temperature of approximately 320 degrees Fahrenheit, together with all of the extraneous trash and other non-volatile materials, is discharged from the still. As the mixture of materials is discharged the flow is directed onto and through a series of wire screens and finally passes through a layer of cotton batting.

In commercial practice there is generally obtained, for example, from a typical barrel of crude oleo-resin the following assortment of materials:

| | | Pounds |
|---|---|---|
| (a) Rosin | | 297 |
| (b) Turpentine | 10.7 gallons | 77 |
| (c) Chips, bark, needles, etc | | 21.5 |
| (d) Sand and fine trash | | 2.8 |
| (e) Batting dross | | 5.7 |
| (f) Water and unaccounted for | | 31.0 |
| Average total/bbl. crude gum | | 435.0 |

Items (c), (d), and (e) are, after distillation of the crude oleo-resin, completely saturated and covered with rosin which is lost, or, sold at a large discount to extraction plants which reclaim rosin from batting dross and other still wastes. In crude oleo-resins of the composition indicated above, the rosin loss per barrel of crude, aggregates approximately 18 pounds. Even in crudes where great care is taken to prevent contamination with extraneous trash, the rosin loss approximates 10 pounds per barrel of crude oleo-resin-distilled. Open-air straining through wire screens and cotton batting has been universally employed. No other practical method for separating the solid impurities are known to have been in use or to have been devised prior to the invention herein described.

Many efforts have been made to apply various types of filters to the filtration of oleo-resins. Major operating difficulties, however, have resulted from one or more of the following causes:

(1) Relatively insoluble gummy substances, to which reference has been made, associated with dust and finely divided trash, ordinarily form impervious coatings over the filtering medium and stop the flow of the liquefied oleo-resinous materials through the filtering medium.

(2) When such stoppage of flow occurs, the filtering apparatus must be drained and the filtering medium renewed or cleaned. These operations if too frequently required entail considerable loss of time and loss of oleo-resin.

(3) The viscosity of oleo-resin varies greatly with its temperature and it coagulates upon cooling. Because of this it is difficult to handle through pipes and pumps. Ordinarily it is necessary that the filtering medium be maintained at the high temperature range of the operation. This is especially true at the time filtration is started. Initial chilling of the oleo-resin by the filter medium as the latter is contacted by the oleo-resin is very undesirable. Particles of unmelted scrape cause much trouble.

(4) The large amount and variable form of extraneous trash contaminating crude oleo-resin ordinarily makes a two-stage filtering operation necessary and the removal of such trash from the filtering mechanism has been a tedious operation attended with considerable loss of oleo-resin adhering to it.

During the past twenty-five years new standards have been established by wood rosins for judging the cleanness of gum rosins. The gum naval stores industry has generally recognized the necessity for improving the cleanness of their products. The situation in the industry has been that the improvement of its methods of distillation must be based upon a solution of its filtration problem. It has been definitely and generally recognized that gravity straining through screens and a filtering medium such as cotton batting can not be depended upon for obtaining the desired results. Efforts directed to development of means for bettering the technique of these methods have heretofore been without commercial success.

An object of the present invention is, therefore, to provide improved apparatus which will minimize the above difficulties and economically provide one or more of the following:

A batch filtering mechanism which can be quickly and economically charged with crude oleo-resin containing all of the extraneous solid impurities with which it is commonly contaminated; means, after the batch has been charged, for sealing the apparatus so that it is vapor tight with internal pressures up to substantially 50 pounds per sq. in., or higher pressures if desired; a filtering medium within the mechanism of any required porosity, so installed that all liquid materials discharged from the vessel during filtration must pass through the said filtering medium; means for preheating the filtering medium before liquid oleo-resin is contacted; means for maintaining the said filtering medium at the highest temperature involved in the processing of oleo-resins; means for bringing liquefied oleo-resins in contact with the filtering medium under hydrostatic pressures as high as and up to substantially 50 pounds per sq. in.; means for liquefying the batch of crude oleo-resin prior to its contacting the filtering medium; means for violent agitation while heating without escape of vapors from the apparatus; means for substantially preventing undissolved gummy substances contained in the crude oleo-resin from reaching the filtering medium; means for substantially removing oleo-resinous material from the contaminating solids before the said solids are discharged from the equipment; means for the quick and economical removal of the said solids from the equipment after their separation from the liquefied oleo-resin; means for accomplishing the entire filtration operation without passing unfiltered oleo-resinous material through pumps or pipes; means for controlling rates of filtration, temperature of filtration, and filtering pressures; and means for changing filtering media without loss of oleo-resinous material incident to drainage of the filtering mechanism.

A further object of the present invention is to provide means for preparing oleo-resin exudates in forms highly suitable for shipment or storage in metal as well as other containers.

The simple apparatus and the sequence of operations described below provide the gum naval stores industry for the first time with a practical and economical method and mechanism for the filtration and preferably the pressure filtration of crude pine oleo-resins prior to their distillation into gum rosin and gum turpentine. Those familiar with the art of processing crude pine oleo-resins will appreciate the importance of this invention as a basis for improvement of methods of distillation and quality of products. Means for effective filtration have been long sought for by the industry both in France and in the United States. The complexities of the problem incident to the peculiar properties of a crude oleo-resin aggregate, combined with rigid commercial limits on the cost of operation, have contributed equally to the difficulty of its solution.

A preferred type of apparatus employed in the treatment of oleo-resins is shown by way of example in the accompanying drawings in which.

Figures 1, 2:
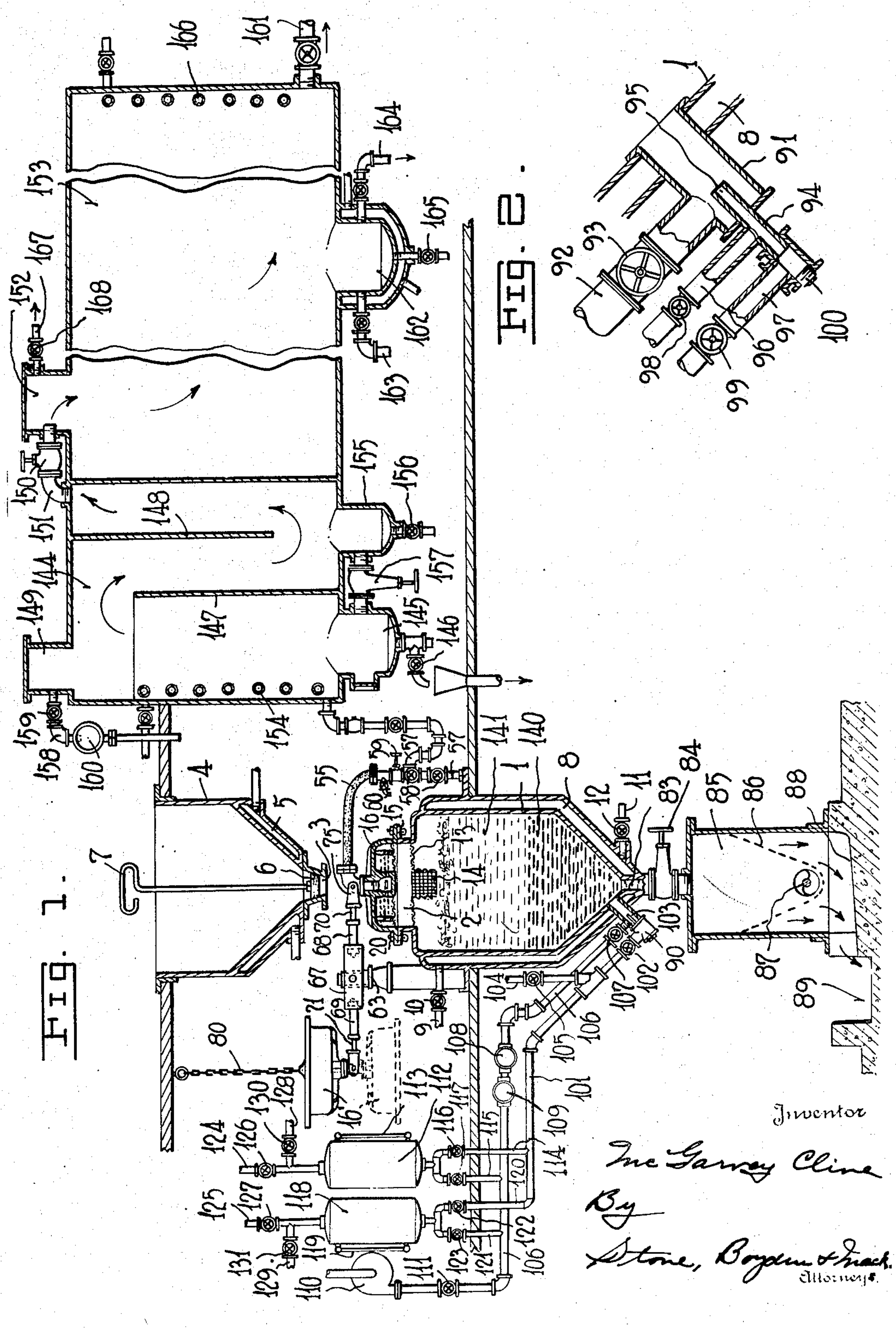
Fig. 1 is a vertical sectional view, partly in elevation, of the apparatus.
Fig. 2 is a cross-sectional view of a modified portion of the apparatus shown in Fig. 1 for introducing various agents into a vessel for treating oleo-resins.

Referring to Fig. 1, the apparatus shown includes a vessel 1, having a charging opening 2, positioned directly below an outlet 3 of a charging hopper 4; and means embodied in and combined with the vessel 1 for carrying out the method described in a copending application Serial No. 20,836 filed May 10, 1935 (Patent No. 2,140,511, dated December 20, 1938) of which the present application is a continuation in part; and also for carrying out the methods described in Patent No. 2,140,512, dated December 20, 1938, and Patent No. 2,140,513 dated December 20, 1938. Reference is herein made to Patent No. 2,140,514, dated December 20, 1938, for oleo-resin emulsions and methods of preparing the same. The said means will be described in detail below.

The charging hopper 4 is preferably provided with an inclined bottom which may be steam jacketed as at 5. In the opening 3 at the bottom of the hopper is a dumping valve 6 which is raised or lowered by means of a handle 7 during a charging operation.

The vessel 1 is preferably provided with an inclined bottom and its sides and bottom are preferably jacketed as shown at 8. Heating fluid may be admitted into the jacket 8 through a pipe 9 provided with a valve 10, and may be withdrawn through a pipe 11 provided with a valve 12. Within the vessel 1, a screening means is horizontally positioned in the upper portion thereof or preferably in the charging opening 2. This screening means comprises an annular screen portion 13 fixed to the wall of the vessel 1 and a central tubular screen portion 14 which forms an unobstructed vertical passage for materials.

The charging opening 2 of the vessel 1 is provided with a flange 15 to which a removable filter head 16 may be attached by any suitable means.

The details of one type of filter head are shown by way of example in Figs. 3 to 7 inclusive. A plurality of filter elements are mounted in spaced relation beneath the cover 17 provided with a flange 18, the edge of which seats on the flange 15 on the charging opening 2 of the vessel 1. A gasket 19 is provided between the cover 17 and the charging opening 2 to prevent leakage of vapors. The cover 17 is adapted to be clamped to the charging opening by suitable clamps such as 20.

Figures 3, 4, 5, 6, 7:
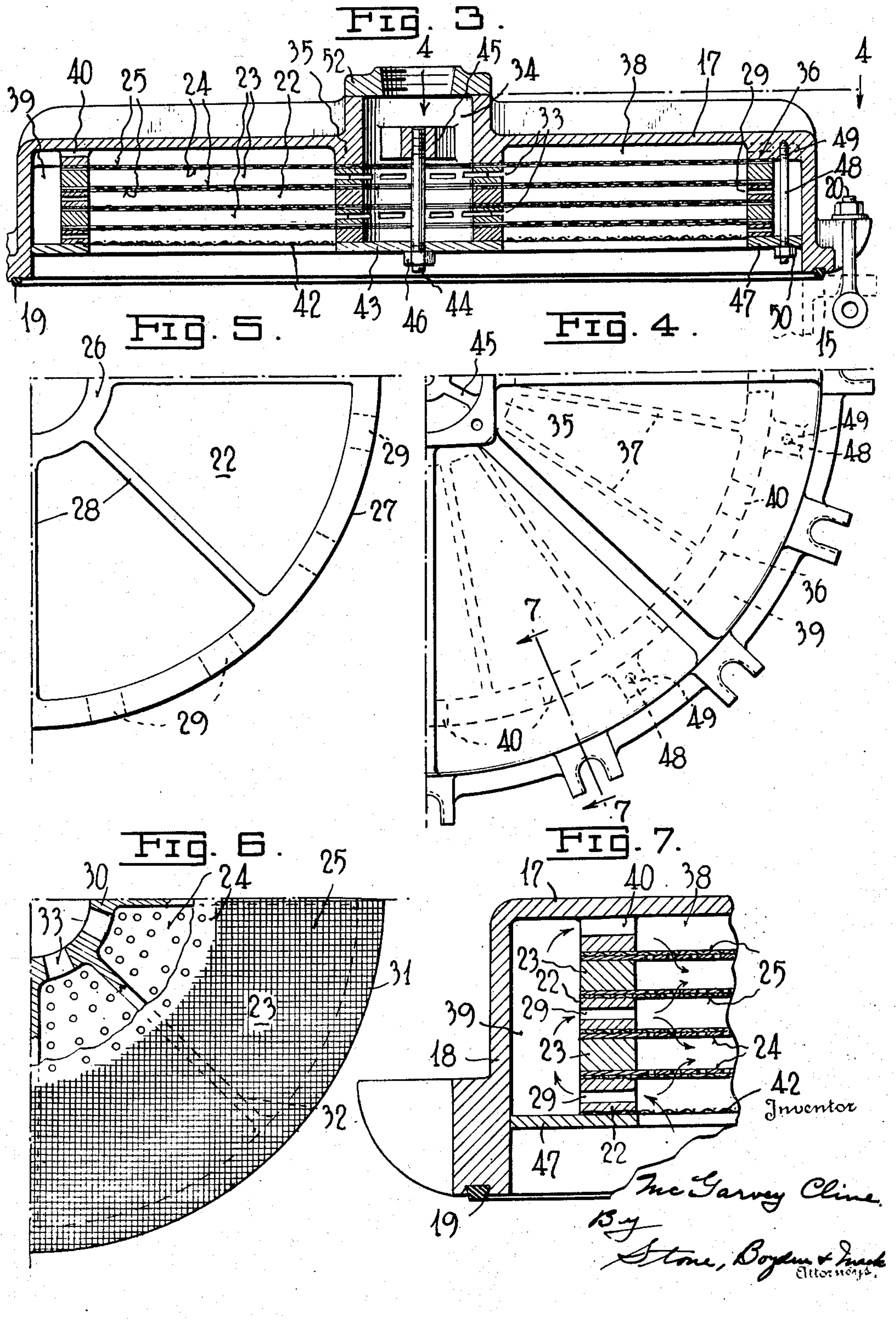
Fig. 3 is a vertical central sectional view of a filter head employed on the treating vessel shown in Fig. 1.
Fig. 4 is a fragmentary view of a portion of the filter head, taken on lines 4—4 in the direction of the arrows;.
Figs. 5 and 6 are additional fragmentary views of the filter head, described in detail hereinafter.
Fig. 7 is a sectional view on line 7—7 of Fig. 4 and shows an enlargement of parts shown in Fig. 3.

The filter unit provided in the filter head shown in cross section in Fig. 3 (enlargement of parts is shown in Fig. 7) comprises porous filter means held in position between spacing means 22 and 23. The spacing means are alternately placed in superposed position with intervening filter plates 24 and filter cloths 25. The detailed construction of each of the spacing means 22 and 23 is shown in Figs. 5 and 6 respectively. Fig. 5 shows a portion of a plan view of a spacing means 22. Fig. 6 shows a portion of a spacing means 23 with a filter cloth 25 and a plate 24 in position on one side, a portion of the filter cloth and plate being cut away to show the plate 24 on the opposite side. The inner ring 30 is shown in cross section in line with the slotted openings 33. It will be noted that the filter unit is actually within the head by reason of the fact that the lower edge of the flange 18 is well below the filter elements.

The spacing means 22 comprises an inner circular portion 26 and an outer circular portion 27 concentric with the portion 26 and joined by spoke elements 28. The outer circular portion 27 is provided with a plurality of passages 29 extending radially therethrough. The inner circular portion 26 is solid.

The spacing means 23 comprises an inner circular portion 30 and an outer circular portion 31 concentrically arranged and rigidly attached to each other by means of spoke elements 32. The outer circular portion 31 is solid. The inner circular portion 30 is provided with a plurality of radial passages 33.

The spacing means 23 may be made integral with the perforated filter plates 24 by welding, if made of metal, or by other means. A plate 24 may be affixed to each side of each of the spacing means 23. The filter cloth 25 may be applied on the outside surface of the plates 24 as shown in Fig. 6.

The spacing means 22 and 23 when placed in position in the filter head, have their inner and outer circular portions in alignment. The inner circular portions form a central passage connected by means of the passages 33 to the spaces formed by the spacing means 23 between the filter elements. With the outlet of the filter head in the center, the passage formed by the inner circular portions of the spacing means is in alignment with the opening 34 in the cover 17. In other words, the inner circular portions coincide with each other and with a circular flange 35 on the inside of the cover 17.

The outer circular portions of the spacing means coincide with each other and with a circular flange 36 on the inside of the cover 17. A plurality of other flanges 37 on the inside of the cover 17 extend radially from the circular flange 35 to the circular flange 36. The flanges 35, 36 and 37 serve to space (at 38) the filter means next adjacent the cover 17 from the inside thereof. The outer circular flange 36 and the outer circular portions of the spacing means 22 and 23 being of less diameter than the cover, form a wall which provides an annular space 39 adjacent the flange 18. The annular space 39 is connected by means of the passages 29 to the spaces formed by the spacing means 22. A plurality of passages 40 extend radially through the flange 36 and connect the space 39 and the space 38. The flange 35 is solid.

The passages 29, 33, and 40 are preferably narrow slits parallel to the planes of the filter elements. The walls of the passages 29 and 40 thus comprise means for directing liquid to be filtered into the spaces between the filter elements, and the wall of the openings 33 comprise means for directing filtered liquid to the opening ing the cover element. The spacing means may be of any shape besides circular as shown. In Figs. 4, 5, and 6, only one quarter of the plan views of the respective means is shown, each of the remaining quarters of each means being substantially similar to the quarter shown to illustrate the said means. Any number of spacers and filter elements may be combined in a filter unit, but when combined with a cover such as 17, it is preferable to have the screen 42 positioned above the edge of the flange 18 as in Fig. 3.

In assembling the parts that make up the filter head, the cover 17 is placed in an inverted position and the various filter elements and spacing means are placed in the cover in succession to provide the arrangement shown in Fig. 3 The lowermost spacing means 22 in Fig. 3 will of course be placed last. Then a screen or perforated plate 42 is placed on this spacing means 22. A solid end-plate 43 is placed across the central passage formed by the inner circular portions of the spacing means. A stud bolt 44 passes through the plate 43, and an end thereof is screwed into a spider 45 in the opening 34 in the cover 17. A nut 46 on the opposite end of the bolt 44 is drawn up tightly against the plate 43. A clamping ring 47 is clamped over the outer circular portions of the spacing means by means of a plurality of stud bolts 48 circumferentially arranged about the filter unit and screwed into bosses 49 in the cover, and by means of nuts 50 drawn tightly against the ring 47. The clamping ring 47 extends across the annular space 39 to the inner surface of the flange 18, the outer edge of the ring fitting snugly against the said surface.

Figure 11:
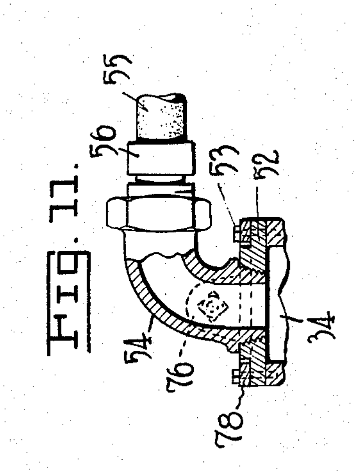
Fig. 11 is a sectional view on line 11—11 of Fig. 9 in the direction of the arrows.

As shown in Figs. 1, 8, 9, and 11, the filter head 16 is connected to means for conveying filtered liquid, and also to means for lifting the filter head on and off the vessel 1. The center opening 34 (Fig. 3) in the cover 17 is provided with a coupling element 52 fastened to the cover by bolts 53 (Fig. 11). An elbow pipe 54 is screwed into the coupling element 52. The elbow 54 is connected to an end of a detachable flexible tube 55 by a coupling 56. The other end of the tube 55 is connected to a header having a plurality of branch pipes 57 each provided with a valve 58. The flow of liquid to the header is controlled by a valve 59. A sampling cock 60 is provided on the header above the valve 59. The connections of the header to other parts of the apparatus will be described below.

The lifting means for the filter head 16 comprises a post 63 and means pivoted on the post for supporting the filter head when the latter is moved off the mouth 2 of the vessel 1. A sleeve 64 is supported adjacent the upper end of the post 63 which serves as a vertical axis about which the sleeve 64 rotates. Pins 65 and 66 project in opposite directions from the sleeve 64 through opposite sides of a yoke 67 that pivots vertically about the pins. Extending in opposite directions from the yoke 67 and perpendicular to the pins 65 and 66 are tubular members 68 and 69 within which are extensible members 70 and 71 respectively. The tubular members 68 and 69 are rigidly fixed to the yoke 67. Collars 72 and 72' having set screws 73 and 73' respectively are provided on the extensible members 70 and 71 for the purpose of preventing longitudinal movement of these members but permitting rotation thereof in the tubular members 68 and 69. The collar 72 on the member 70 is adapted to be fixed to the latter any-where between the free end of the tube 68 and a yoke 75, described in detail hereinafter. The collar 72' is adapted to be fixed to the member 70 along its end portion which projects through the tube 68 within the yoke 67. Collars 72 and 72' are placed in corresponding positions on the extensible member 71. After positioning the extensible member 70 it is rendered longitudinally immovable but rotatable by bringing the collar 72 into abutment and in slidable contact with the free end of the tube 68 and tightening the screw 73, and by bringing the collar 72' into abutment and in slidable contact with the yoke 67 adjacent the fixed end of the tube 68 and tightening the screw 73'.

Figure 9:
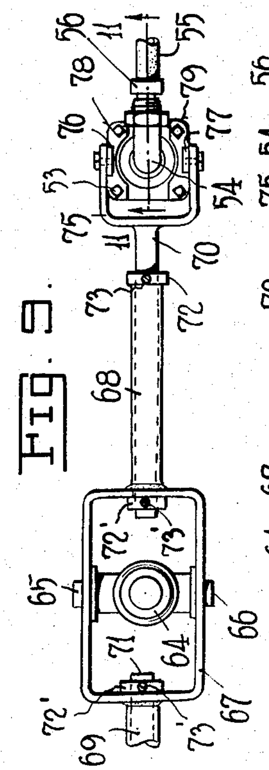
Fig. 9 is a plan view of a portion of the apparatus shown in Fig. 8 including the filter head lifting means.
Figure 8:
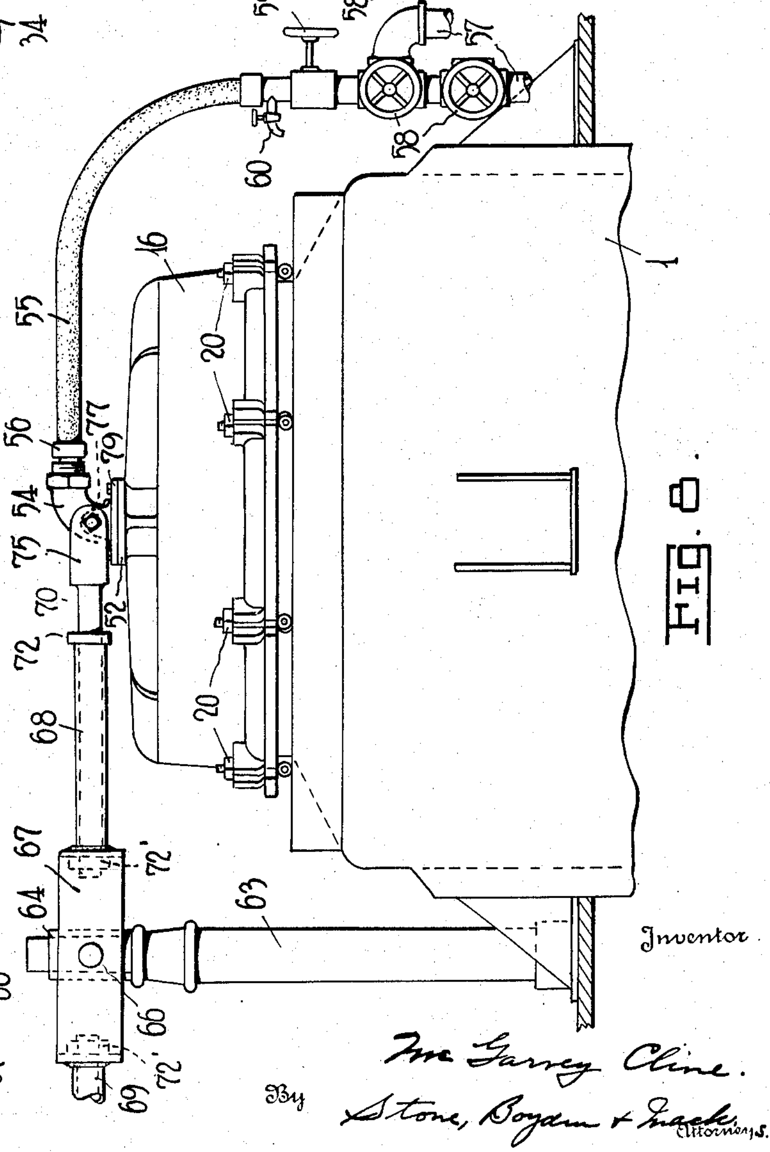
Fig. 8 is a side elevational view of the upper part of a treating vessel including the filter head, its exterior connections for conveying material therefrom, and a portion of a means for lifting the filter head on and off the treating vessel.

At the outer end of each of the extensible members 70 and 71 is a yoke 75, such as that shown in Figs. 8 and 9, whereby attachment is made with the filter heads 16 and 16'. The ends of the yoke 75 are attached to lugs 76 and 77 welded to base plates 78 and 79 respectively which are in turn attached to the coupling means 52.

The filter head 16' is a duplicate of the filter head 16, and the supporting means for each on either side of the post 63 are symmetrical. Thus the filter heads are balanced on the post 63 and may be swung about the post as a center. A simple means is thereby provided for making a quick and easy change of filter heads. After a filter head has been in use for some time, the clamps 20 are released, the pipes 54 and 55 are uncoupled, and the filter head is moved off the mouth of the vessel 1 while it is being balanced by a clean filter head that is ready to be swung into place on the vessel 1. In Fig. 1, the filter head 16 is shown in operative position. The filter head 16' is shown in dotted lines in the position assumed thereby when ready to replace the filter head 16, and the filter head 16' is shown in full lines in an inverted position. A filter head may be inverted by rotating it on the rotatable, extensible member attached thereto, and may be held in such position by chains 80. Attachment of one filter head to the mouth of the vessel 1 prevents all other movement of the other filter head. While in the inverted position a filter head is easily cleaned and disassembled and fitted with fresh filter clothes. It is possible for a single operator to make a change of filter heads, disassemble, and reassemble them.

In the operation of a filter unit of the type shown and described, direct filtration of floating fluid materials in a vessel through filter elements of relatively fine porosity is made possible. If the unit is provided at the top of a vessel, liquid to be filtered is permitted to rise in the vessel. The horizontal surface of the liquid initially comes into contact with a filter surface and filtered material is directed horizontally out of contact with the filter. As the liquid continues to rise, portions of the liquid are divided into streams which flow horizontally into contact with filter elements, and filtered liquid is directed horizontally out of contact with these filter elements.

Referring to Figs. 3 and 7, the course of the liquid through the filter unit shown combined with the cover 17, may be readily followed. The liquid rising in the vessel passes upwardly through the screen 42. Some of the liquid then passes through the lowermost filter elements 25 and 24 (in the order mentioned) into a space formed by spacing means 23, and some of the liquid flows through passages 29 in the lowermost spacing means 22 into the annular space 39. As the liquid rises in the space 39, some of it flows through passages 29 in the spacing means 22 further up in the filter unit; and some of the liquid as it fills the space 39 flows through the passages 40 in the flange 36. Some of the liquid that flows from the space 39 through passages 29 into spaces formed by spacing means 22 positioned between two spacing means 23 is forced upwardly through filter elements 25 and 24 (in the order mentioned) into a space formed by the spacing means 23 next above, and some of the liquid passes downwardly through filter elements 25 and 24 into a space formed by the spacing means 23 next below. Liquid that flows through passages 40 into the space 38, passes downwardly through filter elements 25 and 24 into a space formed by the spacing means 23 next below. Liquid in the spaces formed by the spacing means 23 is free to flow through passages 33 and finally out through the center opening 34 in the cover 17.

Additional features of the apparatus for treating oleo-resins are shown in Fig. 1 and are described as follows: The conical bottom of the vessel 1 is provided with an outlet 83 controlled by a valve 84. The outlet 83 is connected to a chamber 85 provided with a screen 86 preferably in the form of a trough at the bottom of which is a screw conveyor 87 for conveying solid or unfiltered material out of the chamber 85. A drain 88 in the bottom of the chamber 85 permits flow of liquid matter out into a channel 89.

A fluid injector 90 is provided at the bottom of the vessel 1 adjacent the outlet 83. A form of such injector is shown in detail in Fig. 2. In the latter form, a tube 91 passes through the jacket 8 and opens into the vessel 1. A pipe 92 provided with a valve 93 is connected to the side of the tube 91. A tube 94 concentric with respect to the tube 91 extends through the outer closed end of the latter and is positioned to permit the passage of liquid from the pipe 92 into the path of fluid passing through the open end 95 of the said tube 94. Pipes 96 and 97 provided with valves 98 and 99 respectively are connected to the tube 94. The outer end of the tube 94 is provided with a plug 100 which may be removed for cleaning or drainage purposes or to connect thereto any auxiliary fluid conducting means (not shown).

The injector 90 shown in Fig. 1 differs somewhat from the form shown in Fig. 2 in that only one pipe 101 provided with a valve 102 is connected to the inner concentric tube 103 that corresponds to the tube 94 in Fig. 2. A pipe 104 provided with a valve 105, and corresponding to the pipe 97 in Fig. 2, is connected to the pipe 101 instead of directly to the injector tube 90. A pipe 106 having a valve 107, and corresponding to the pipe 92 in Fig. 2, is connected directly to the tube 90.

The pipe 106 is provided with a pressure gauge 108, and a volumetric gauge 109, and is connected to a force pump 110. A valve 111 is provided in the pipe 106 near the pump. A tank 112 provided with a glass gauge 113 is connected to pipes 101 and 106 by pipes 114 and 115 respectively, having valves 116 and 117. A tank 118 provided with a glass gauge 119, is likewise connected to pipes 101 and 106 by pipes 120 and 121, respectively, having valves 122 and 123. Supply pipes 124 and 125 having valves 126 and 127 respectively are connected to the tanks 112 and 118 respectively. Pipes 128 and 129 for compressed air, having valves 130 and 131 respectively, are connected to pipes 124 and 125 respectively.

In the processing of crude oleo-resins in the above-described apparatus for purposes of liquefaction and of filtration, it is preferable to treat the oleo-resinous material in large batches, for example, from eight to ten barrels at a time. The crude oleo-resin exudates to be treated are placed in the charging hopper 4, the conical bottom of which is heated sufficiently to cause ready flow of the oleo-resin into the vessel 1. While charging the vessel 1, the valve 6 in the charging hopper is open; the valves 84, 102 and 107 are closed; heating fluid is admitted into the jacket 8 if desired; the filter head 16 is removed from the mouth of the vessel 1; and the screens 13 and 14 are removed if necessary. The crude oleo-resin may be liquefied in the hopper 4 but it is preferable to avoid heating to high temperatures in the hopper in order to prevent loss of volatile constituents. When the valve 6 is raised by an operator by pulling upwardly on the handle 7, the condition of the material in the hopper should be such as to permit it to slide freely out through the opening 3.

The charging operation is terminated when the level of crude oleo-resin in the vessel 1 is preferably substantially below the level of the flange 15. If screens 13 and 14 are used (both may be eliminated if desired) the charge may be brought up to the lower end of the tubular portion 14. For a ten barrel batch it is desirable to have an unfilled space in the vessel 1 between the upper level of the charge and the filter head of approximately 100 gallons, to allow for expansion during heating. After the charging operation, the filter head 16 is clamped on at the mouth 2 by means of the clamps 20, the valve 59 and the cock 60 are closed, and liquefaction of the charge is commenced.

Liquefaction of the oleo-resinous material in the vessel 1 is accomplished by means of heat or by means of solvents or combinations of such means. It is possible, by means of the apparatus described, to add solvents or other agents to the oleo-resins and obtain a thorough mixing of these materials. The solvents and other agents may be added before, during or after applying heat. The use of solvents facilitates liquefaction and lessens the viscosity so as to permit increased rates of filtration or the use of denser filtering media. Turpentine or other solvents may be employed. Solvents, however, are not necessary in order to secure satisfactory filtration. Either direct or indirect heat alone may be employed.

In liquefying by heat, the valves 10 and 12 in the pipes 9 and 11 respectively are adjusted to admit steam or other heating fluid into the jacket 8 and to regulate the temperature of the latter. The temperature is raised sufficiently high to render the oleo-resin mass free-flowing. Melting of the oleo-resin mass is greatly facilitated by agitation. Although mechanical agitation may be employed, it is preferred to agitate the charge with steam. Superheated or saturated steam may be injected into the charge through the jet 103 by opening the valves 102 and 105 in the pipes 101 and 104 respectively.

Solvents for liquefaction purposes may be introduced into the vessel 1 from the tank 118. By opening valves 122 or 123 a solvent is passed into pipes 101 or 106 respectively. The valve 102 being open, the solvent may be fed through the nozzle 103 with or without steam. Steam assists in distributing the solvent more rapidly and thoroughly throughout the oleo-resin charge. When the solvent is fed through the pipe 101 it can be premixed with the steam from the pipe 104. When the solvent is fed through the pipe 106, and steam is fed through the nozzle 103, the mixing of the steam and solvent takes place while the latter is injected into the oleo-resin charge by the steam and while in contact with the oleo-resins. Pressure may be applied to the solvent by introduction of compressed air, nitrogen or other gas through the pipe 129 above the surface of the liquid in the tank 118.

Alkali or alkaline earth hydroxides or alkali carbonates or the like in solution may be employed as set forth in application Serial Number 24,981 filed June 4, 1935, and application Serial Number 34,623 filed August 3, 1935. Such reagents may be introduced in a charge in the vessel 1 from the tank 112 by opening the valves 116 or 117, and 102 or 107 respectively. It is possible to introduce these reagents alone or with steam or solvents or both. As with the solvent, the steam can be premixed with a reagent in the pipe 101 or the latter can be mixed with the steam in the injector tube and thoroughly and rapidly distributed throughout the charge by injection into the oleo-resin charge. Pressure may be applied to the surface of the reagent in the tank 112 by introducing compressed air or nitrogen through the pipe 128.

The amounts of agents to be introduced into a charge may be measured by means of the sight gauges 113 and 119 on the tanks 112 and 118 respectively. Sufficient alkaline reagent is mixed with a charge to reduce the acidity or corrosiveness of the oleo-resins. The amount added may be enough to neutralize substantially the water-soluble acids in the oleo-resins or in certain instances enough to neutralize the water-soluble acids and a portion of the water-insoluble resin acids.

Brine or a concentrated sodium chloride solution, or calcium chloride solution, may be introduced into an oleo-resin charge to be mixed therewith. In mixing the brine with the oleo-resin, the brine is pumped by means of the pump 110 through the pipe 106 and into the injector 90 from which it is injected into the charge in the vessel 1 by the steam jet 103. If desired either an alkaline reagent from the tank 112 or solvent from the tank 118 or both may be mixed with the brine or salt solution in the pipe 106 or in the injector 90. The brine may be hot or cold.

Liquefaction of oleo-resins may be accomplished in an auxiliary vessel (not shown) of much larger capacity than the vessel 1. The liquefied material in the larger vessel may then be forced through the vessel 1 and through the filter head 16 until a certain amount of contaminating solids have accumulated in the vessel 1. After this occurs, the passage of the liquid oleo-resinous material in the vessel 1 through the filter head 16 is completed by forcing the material upwardly by means of a liquid displacing medium in the manner described below.

The displacement of a charge of oleo-resin from the vessel 1 may be accomplished by means of brine or other liquid that does not readily dissolve oleo-resins or that does not readily react therewith and that has a higher specific gravity than the oleo-resins. For instance, many other salt solutions besides sodium chloride or calcium chloride solutions may be employed including for instance solutions of such salts as sodium acetate. If it were practical from an economical standpoint, a liquid such as mercury would be satisfactory for this purpose.

A sodium chloride brine having a specific gravity of approximately 1.15 is highly satisfactory for use as a displacing medium.

A displacing medium 140, such as the above, is shown in the vessel 1. A layer of oleo-resin material 141 is shown resting on the surface of the displacing medium. The latter serves essentially as a mechanical means which has two important uses. First, it serves as a tightly fitting piston that can be moved at an easily controlled rate of speed. The medium is introduced in the vessel 1 by means of the pump 110 which forces it through the pipe 106 and the injector tube 90. These latter parts thus comprise means for creating a liquid piston. The rate of flow into the vessel 1 may be regulated by means of the valves 107 or 111 or other conveniently located means. As the displacing medium is fed into the vessel 1, the level thereof rises in the vessel, which causes the oleo-resin layer to rise, and the liquefied oleo-resin passes through the filter head 16. While the screens 13 and 14 prevent the bulk of the larger particles of floating solid matter from reaching the filter head, the upward flow of the liquefied oleo-resin, is not appreciably retarded, because the central passage formed by the screen 14 remains unobstructed. The liquid oleo-resin is expelled from the filter head 16 through the flexible tubing 55, the valve 59, and any one or more of the valves 58 that are open at the time.

The use of a filter head 16 on a vessel in which heat is applied to the charge is an advantage in that prior to filtering the charge the vapors therefrom come into contact with the filter cloth and other parts of the filter head thereby preheating the same. The usual practice in melting is to heat the crude oleo-resin to approximately its boiling point. This means that the vapors condensing on the filter head preheat the filter to approximately 212 degrees F. before liquid oleo-resin comes in contact with the filtering medium. When higher or lower temperatures are used the filter head is preheated to corresponding temperatures. By way of aiding filtration through canton flannel sheets or wire filter cloth in the filter head 16, ground charcoal of a particle size between about 20 and 36 mesh may be used. The charcoal may be added to the crude oleo-resin at the time of charging. It floats and forms a pervious cake on the filter cloth during the earlier stages of filtration.

During the introduction of the displacing medium into the vessel 1 the operator may observe the volumetric gauge 109 and control the rate of flow and the volume as desired. The stroke of the piston 140 is thus measured in gallons. When the total gallons of displacing medium introduced equals the gallon capacity of the vessel 1, the upper surface of the piston has reached the filter elements in the filter head 16, and the liquefied oleo-resinous materials have been expelled through the filter. The filter elements are then washed by forcing an additional quantity of the displacing medium into the vessel 1. The surplus displacing medium passes into a separator 144 directly after the last portion of oleo-resin material. The surplus brine that passes into the separator 144 is permitted to settle and may be drawn off periodically from a sump 145 through a valve 146 to be returned to a brine storage tank.

During the filtration of the oleo-resin, the pressure induced in the vessel 1 by the upward movement of the liquid piston and by the resistance of the filter to the passage of the liquid oleo-resins through it, is observed on the meter 108. The pressure required for forcing liquid oleo-resin through a filter medium of a porosity required for the effective removal of suspended solids contained in crude pine oleo-resin may be as high as substantially fifty pounds per square inch. In case the filtering pressures become abnormally high, the filter heads are changed. When making a change, some of the liquid displacing medium is withdrawn from the vessel 1 through the valve 84. During this withdrawal, the valve 60 may serve as an air vent. When the liquid level in the vessel 1 has been sufficiently lowered the filter head is replaced by another. Filtration is then resumed by continuing the upward movement of the liquid piston. The ability to substitute a fresh filtering medium without loss of oleo-resin is a feature of the present invention which contributes greatly to its practicability and its operating efficiency.

A second important purpose is served in the mechanical use of the liquid displacing medium, and that is, this medium serves as a conveying means for removing solids from the vessel 1 after filtration has been completed. The presence of large amounts and of varied forms of solids in crude pine oleo-resins has, in the past, been the main reason for using, practically exclusively, open screens to obtain a separation of these solids. Open screens have been required because the chips, pine needles, bark, sand, etc. form tangled mats of materials which have been difficult to remove from closed types of apparatus.

For the purpose of removing the above solids from the vessel 1 after filtration, the filter head 16 is loosened and the valve 84 is opened. The outrush of the displacing medium that served as the liquid piston, carries all of the solids with it. As the floating solids pass downwardly in the vessel 1 and approach the discharge valve 84, they may be kept from matting by a pressure injection of displacing liquid through the pipe 106 (Fig. 1) or 92 (Fig. 2). The valve 107 (Fig. 1) or 93 (Fig. 2) is regulated in association with the regulation of the valve 84.

The displacing liquid, such as brine, discharged from the vessel 1, and the solids separated from the oleo-resins fall onto the screen 86. This latter screen, exposed to the atmosphere, is merely for the purpose of separating solids from the brine and not solids from oleo-resins.

Gummy substances, which are usually contained in crude pine oleo-resin and which are relatively insoluble in the liquefied oleo-resin aggregate, are of higher specific gravity than the liquefied aggregate. Such substances in association with finely divided solid impurities produce highly impervious coatings on filtering media with which they come in contact. They have, therefore, constituted one of the greatest obstacles to the pressure filtration of pine oleo-resins. One of the highly advantageous characteristics of the above described filtering apparatus is that it permits the settling of these materials away from the filtering medium so as to avoid contacting the latter with such materials. This is accomplished by regulating the rate of filtration in the following manner: The capacity of the vessel 1 in gallons being known, the rate of injecting the displacing medium forming the liquid piston is kept uniform by means of the flow meter 109 and the valve 107 through which the displacing medium passes.

The pressure of filtration observed on the meter 108 remains constant for a given rate of injection of the displacing medium, or the pressure may increase gradually. If the gummy matter reaches the filtering medium, the pressure increases rapidly. Any marked or substantially abrupt fluctuation in filtering pressure indicates that the rate of filtration is too high to permit the gummy substances and associated solids to settle away from the filtering medium. In such cases the injection of brine is temporarily stopped to permit sedimentation within the vessel 1 to progress, and after a period of time the injection of the displacing medium is resumed at a slower rate. At the completion of a charge the settled gummy substances are deposited on the floating chips, bark and pine needles retained under the screen 13 or 42. The gummy substances are highly adhesive and adhere to this floating trash and are discharged from the vessel 1 along with the solids. Experience, of course, teaches the operator what rates of filtration are best for various grades of crude oleo-resin.

The tank 144 for receiving filtered oleo-resins from the vessel 1 is provided with baffles 147 and 138. The baffle 147 extends from the bottom of the tank 144 and around the sump 145 upwardly to within a relatively short distance from the top of the tank. The baffle 148 is spaced from the baffle 147 and extends from the top of the tank downwardly to within a relatively short distance from the bottom.

Liquefied oleo-resin passing from the vessel 1 through one of the pipes 57 enters the tank 144 at adjacent the bottom. The level rises to a point within the dome 149. A valve 150 in an outlet pipe 151 leading from the top of the tank 144 to a dome 152 of a storage compartment 153, may be kept open to permit overflow of oleo-resins into this compartment. During the passage of the oleo-resins through the tank 144 between the baffles 147 and 148, settling takes place and this may be hastened by heat supplied through a coil 154. Any material settling out of the oleo-resins after they pass over the baffle 147, collects in a sump 155 from which it may be drawn off through a valve 156 or run into the sump 145 by opening a valve 157 provided in a connection between the sumps 145 and 155. Liquids and other substances of lower specific gravity than the liquid oleo-resin are removed through a pipe 158 connected to the dome 149 and having a valve 159 and a sight glass 160 therein.

The storage space 153 is preferably elevated for gravity discharge into tank cars through an outlet pipe 161, or into stills through a steam jacketed sump 162 and pipe lines 163 and 164 which may be heated and connected to the sump above the bottom thereof. A drain pipe having a valve 165 is connected to the bottom of the sump 162 for withdrawal of brine that may have reached the space 153. A heating coil 166 is provided in the storage space 153 to maintain material therein in a liquid condition.

A vent line 167 connected to the dome 152 and having a valve 168 permits of the operation of both the tank 144 and the storage space 153 under pressures for example slightly greater than atmospheric pressures. If desired, additional means (not shown) may be included in this line as for instance check valves that operate to admit air as material is drawn from the tank 144 or storage space 153, and that operate to direct vented vapors and air through a condenser for recovery of such vapors, the air from the condenser being led through a water seal.

Figure 10:
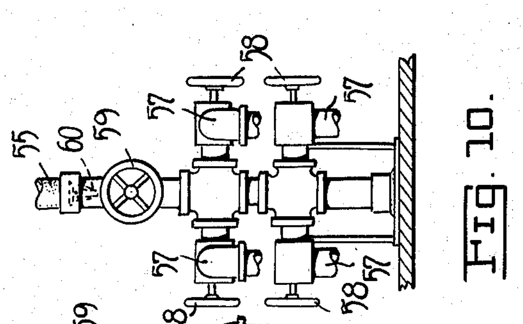
Fig. 10 is a front view of a portion of the apparatus shown in Figs. 1 and 8, including a header arrangement for the distribution of material passing from the treating vessel through the filter head.

Each of the pipe connections 57 in the header shown in Figs. 1, 8 and 10 may lead to separate tanks 144 provided with a storage space 153. By this means it is possible to divide a given batch of oleo-resins into fractions. At any stage of the filtering operation it is possible to divert the filtrate into different tanks so that products of different specific gravities are separately collected. The sampling cock 60 above the header is opened from time to time to sample the filtrate. In taking samples the gate valve 59 may be closed. As the filtrate changes in character it can be diverted into the separator desired. Experience soon teaches the proportion of any batch which goes to a particular separator. It is possible to control the distribution of the various portions by watching the flow meter 109 and manipulating the valves according to the volume expected in each portion.

The apparatus described is economical to install and gives a minimum of operating difficulties. It is particularly efficient and economical in the processing of crude oleo-resins.

I claim:

1. In apparatus for treating crude oleo-resinous material, a vessel, an inlet for material to be treated and of such character as mixtures of oleo-resinous and extraneous substances, a removable closure for said inlet, filter means having a relatively fine-pored filter medium positioned within an upper zone in said vessel, outlet means connected to an outlet in the lower part of said vessel for removal of material including solids not passing through said filter means, a second outlet in the upper part of said vessel for the discharge of material passing through said filter means, the said filter means being in the path of material passing from said vessel through said second outlet, said second outlet being located in said removable closure and said filter means being nested within it and embraced by its side walls, means for creating a liquid piston in the said vessel movable to and from the second outlet and for bodily displacing the oleo-resinous portion of the said material and forcing it through the said filter by means of a movable surface of the piston, and means for controlling the rate of movement of the said surface of the piston.

2. In apparatus for treating crude oleo-resinous material, a vessel, an inlet for material to be treated and of such character as mixtures of oleo-resinous and extraneous substances, a removable closure for said inlet, injector means for injecting fluids into a lower zone in said vessel, filter means having a relatively fine-pored filter medium requiring pressure for removing finely divided solid matter from material to be filtered, outlet means connected to an outlet in the lower part of said vessel for removal of material including solids not passing through said filter medium, a second outlet in the upper part of said vessel for the discharge of material passing through said filter means, the said filter means being positioned in said removable closure and nested in and embraced by its side walls and positioned to filter liquid oleo-resinous material passing from said vessel through said second outlet, means for conducting steam to the said injector means, means for conducting liquid treating agents to the said injector means, means for creating a liquid piston in the said vessel for bodily displacing the oleo-resinous portion of the said material and forcing it through the said filter means by means of a movable surface of the piston, and means for conducting displacing liquid for said liquid piston to the said injector means, the said injector means having passages for the flow of steam, liquid treating agents and displacing liquid therethrough into the said vessel.

3. In apparatus for treating crude oleo-resinous material, a vessel, an inlet for material to be treated and of such character as mixtures of oleo-resinous and extraneous substances, a removable closure for said inlet, means for injecting fluids into said vessel, filter means for removing finely divided solid matter from such mixtures, outlet means connected to an outlet in the lower part of said vessel for removal of material including solids not passing through said filter means, a second outlet in the upper part of said vessel for the discharge of material passing through said filter means, said second outlet being located in said removable closure, and said filter means being nested in and embraced by its side walls, means for creating a liquid piston in the said vessel for bodily displacing the oleo-resinous portion of the said material and forcing it through the said filter means by means of a movable surface of the piston, means for conducting displacing liquid for the liquid piston into the vessel through the injecting means for bodily displacing the oleo-resinous portion of said material, means for controlling the volume and rate of flow of the displacing liquid, a volumetric gauge for the said displacing liquid and pressure gauge for the said displacing liquid.

4. In apparatus for treating oleo-resinous material, a treating vessel, an inlet for material to be treated and of such character as mixtures of oleo-resinous and extraneous substances, a removable closure for said inlet, filter means provided with a relatively fine-pored filter medium in the path of material passing out of said vessel, a first outlet means leading from the lower part of said vessel for removal of material including solids not passing through said filter means, a second outlet in the upper part of said vessel for the discharge of material passing through said filter means, said second outlet being located in said removable closure and said filter means being nested within said closure and embraced by its side walls, means for creating a liquid piston in said vessel for bodily displacing the oleo-resinous portion of the said material and forcing it through said filter means by means of a movable surface of the piston, means below the said filter for introducing liquid under pressure into the vessel while bodily displacing oleo-resinous material by means of said piston upwardly through the filter, indicator means for determining at any given time during the introduction of the said liquid the pressure of the liquid while in its upward course in the vessel, and indicator means for determining the volume of liquid introduced in a given period at the said pressure.

5. In apparatus for treating oleo-resinous material, a treating vessel, an inlet for material to be treated and of such character as mixtures of oleo-resinous and extraneous substances, a removable closure for said inlet, filter means provided with a relatively fine-pored filter medium in the path of material passing out of said vessel, first outlet means connected to an outlet in the lower part of said vessel for removal of material including solids not passing through said filter means, a second outlet in the upper part of said vessel for the discharge of material passing through said filter means, said second outlet being located in said removable closure and said filter means being nested in it and embraced by its side walls, means for creating a liquid piston in said vessel for bodily displacing the oleo-resinous portion of the said material and forcing it through said filter means by means of a movable surface of the piston, means below the said filter means for introducing liquid for said piston under pressure into the vessel while bodily displacing oleo-resinous material by means of said piston upwardly through the filter, indicator means for determining at any given time during the introduction of the said liquid the pressure of the liquid while in its upward course in the vessel, indicator means for determining the volume of liquid introduced in a given period at the said pressure, and means for separating into fractions of different specific gravities the oleo-resinous material passing from the said filter means.

6. In apparatus for treating oleo-resinous material, a treating vessel, an inlet for material to be treated and of such character as mixtures of oleo-resinous and extraneous substances, a removable closure for said inlet, filter means provided with a relatively fine-pored filter medium in the path of material passing out of said vessel, first outlet means connected to an outlet in the lower part of said vessel for removal of material including solids not passing through said filter means, a second outlet in the upper part of said vessel for the discharge of material passing through said filter means, said second outlet being located in said removable closure and said filter means being nested in it and embraced by its side walls, means for creating a liquid piston in said vessel, means below the said filter means for introducing liquid for the piston under pressure into the vessel while bodily displacing oleo-resinous material by means of said piston upwardly through the filter means, and distributing means connected to the said filter means through said removable cover for separating into fractions of different specific gravities the oleo-resinous material passing from the said filter means.

7. Apparatus for treating oleo-resinous material comprising a vessel having an opening in the top thereof for the introduction of mixtures of oleo-resinous and extraneous substances, a detachable cover for said opening, said cover also having an opening therethrough, filter means removable with and attached to said cover adjacent the opening therein, outlet means in the lower part of said vessel for the removal of material including solids not passing through said filter means, said opening in said cover comprising an outlet opening whereby material passing through said filter means is discharged from said vessel, said cover having at its edge a wall extending therefrom to a point below the lowermost portion of said filter means and encircling the filter means for protecting the latter on removal or replacement thereof over the said opening in the top of the vessel.

8. Apparatus comprising a composite filtering means including a cover element for an opening in a vessel, the said cover element comprising a top wall and a side wall, the said top wall having an opening therein, a plurality of spaced filter elements disposed in the cover element between the top wall and the free edge of the said side wall, the said filter elements being attached to the said cover element and positioned concentrically around the said opening in the said cover element and substantially parallel to the plane of the said latter opening, means for directing liquid to be filtered into a space between the said filter elements, and means for directing filtered liquid to the said opening in the said cover element.

9. Apparatus comprising a cover for a vessel, the said cover having an outlet opening for material in the vessel, filter elements integral with the said cover and removable therewith, and means for supporting the cover and filter assembly and for removing the cover from the vessel, the said means including a pivotal support, a beam balanced on the said support and having an end thereof pivotally attached to the said cover provided with said filter elements and having its opposite end likewise attached to a similar cover provided with similar filter elements for replacing the first named cover and filter elements.

10. In apparatus for treating crude oleo-resinous material, a vessel having filter means adjacent an outlet in the upper part of said vessel for removing finely divided suspended matter from the said material, a foraminous means positioned beneath and spaced from the said filter means and extending across the width of the said vessel for the removal of coarser solid matter from the said material, the said screen having a centrally disposed opening therein and foraminous means extending around the said opening and downwardly therefrom forming an unobstructed passage for the said material.

11. Apparatus comprising a cover for a vessel, the said cover having a side wall and top wall and having an opening centrally positioned in the top wall, an inner flange extending around the edge of the said opening, the said flange being integral with the said top wall and extending outwardly therefrom within the said side wall, an outer flange integral with the said top wall and extending around the first named flange and spaced from the said side wall and the said first named flange, a plurality of inner solid spacer elements coinciding in shape with the first named flange and in alignment therewith, an equal number of outer solid spacer elements coinciding in shape with and in alignment with the second named flange, the inner spacer elements forming a centrally disposed passage in line with the said opening in the top wall of the said cover, means closing the said passage at its end opposite the said opening, means for clamping the said spacer elements against the respective flanges, a filter sheet clamped between the flanges and the next adjacent inner and outer spacer elements, and a filter sheet clamped between each pair of adjacent spacer elements, the said filter sheets extending across the space between the inner and outer spacer elements parallel to each other, the said outer flange having passages therethrough connecting a space between two filter sheets with the space adjacent the side wall of the cover, alternate outer spacer elements having passages therethrough connecting the last named spaces, the outer spacer element next adjacent the outer flange being without passages therethrough and alternate inner spacer elements having passages therethrough connecting the said centrally disposed passages with a space between two filter sheets, the inner spacer element next adjacent the inner flange having the connecting passages.

12. Apparatus for treating crude oleo-resins, which apparatus comprises a vapor tight vessel for crude oleo-resins, means for injecting steam into the vessel, means for introducing liquid treating agents into the said vessel, a filter screen within the vessel and extending across the width of the vessel adjacent the mouth thereof, a removable cover for the mouth of the said vessel, the said cover having an opening and an outlet pipe connected thereto, and additional filtering means in said cover and attached thereto for filtering liquids passing into the said outlet pipe.

13. Apparatus for treating crude oleo-resins, which apparatus comprises a vapor tight vessel for crude oleo-resins, means for injecting steam into the vessel, means for introducing liquid treating agents into the said vessel, a filter screen within the vessel and extending across the width of the vessel adjacent the mouth thereof, a removable cover for the mouth of the said vessel, the said cover having an opening and an outlet pipe connected thereto, and filtering means in said cover and attached thereto for filtering liquids passing into the said outlet pipe, the said last named filtering means having filters of finer porosity than the porosity of the said filter screen.

14. Apparatus of the type described comprising a container having a capacity to hold a batch of oleo-resinous material to be filtered, a cover for said container provided with a center opening and outer downwardy extending side walls, a pressure filter located within said cover and within the side walls thereof, the side walls of said cover extending downwardly at least as far as the lowermost portion of said filter, said filter having a plurality of filter elements concentrically arranged about the said center opening and spaced from each other, solid spacing means between the filter elements adjacent the inner and outer edges thereof, alternate inner and outer spacing means having passages for liquid entering between the filter elements, solid spoke-like elements positioned against both faces of each filter element and extending across the faces thereof from the inner to the outer spacing means; and the said filter element and inner spacing means forming a central passageway for filtered liquid passing to the opening in the said cover.

15. Apparatus of the type described comprising a container having a capacity to hold a batch of oleo-resinous material to be filtered, a cover for said container provided with a center opening and outer downwardly extending side walls, a pressure filter located within said cover and within the side walls thereof, the side walls of said cover extending downwardly at least as far as the lowermost portion of said filter, said filter having a plurality of filter elements concentrically arranged about a center passageway and spaced from each other, solid spacing means between the filter elements adjacent the inner and outer edges thereof, alternate inner and outer spacing means having passages for liquid entering between the filter elements, solid spoke-like elements positioned against both faces of each filter element and extending across the faces thereof from the inner to the outer spacing means, and means for directing filtered liquid to the said opening.

16. Apparatus for treating crude oleo-resins, which apparatus comprises a vapor type vessel for crude oleo-resins, having an inlet opening in the upper portion for introduction of material to be treated and an outlet opening in the lower portion for discharge of spent material, means for injecting steam into said vessel, means for introducing liquid treating agents into said vessel, a removable cover for the inlet opening of said vessel, said cover having a discharge opening therethrough and an outlet pipe connected thereto for the passage of material which has been treated, and filtering means in said cover and attached thereto for filtering liquids passing into said outlet pipe.

McGARVEY CLINE.

CERTIFICATE OF CORRECTION.

Patent No. 2,328,891. September 7, 1943.

McGARVEY CLINE.

It is hereby certified that error appears in the printed specification of the above numbered patent requiring correction as follows: Page 1, first column, line 50, for "and" read --sand--; page 4, first column, line 75, for "ing" read --in--; page 8, first column, line 26, for "138" read --148--; and that the said Letters Patent should be read with this correction therein that the same may conform to the record of the case in the Patent Office.

Signed and sealed this 9th day of May, A. D. 1944.

Leslie Frazer

(Seal) Acting Commissioner of Patents.